3,813,370
PROCESS FOR THE CHLORINATION OF
POLYMERIC MATERIALS
Gian Paolo Gambaretto and Gianpietro Talamini, Padova, and Giancarlo Palma, Venice, Italy, assignors to Montecatini Edison, S.p.A., Milan, Italy
No Drawing. Filed May 8, 1972, Ser. No. 251,401
Claims priority, application Italy, May 10, 1971, 24,307/71; Jan. 24, 1972, 19,734/72
Int. Cl. C08f 27/03
U.S. Cl. 260—88.2 S        8 Claims

ABSTRACT OF THE DISCLOSURE

Vinyl chloride homopolymers and copolymers and olefinic polymers and copolymers are chlorinated in the dry phase with gaseous chlorine in the presence of a small amount of elemental fluorine in an environment which is substantially free of ultraviolet radiation and organic peroxides.

CROSS REFERENCE TO RELATED APPLICATIONS

None.

BACKGROUND OF THE INVENTION

Field of the invention

The present invention relates to processes for the chlorination of polymeric materials. More particularly, it relates to the chlorination, with gaseous chlorine, in the dry phase, of polymeric materials including vinyl chloride polymers and/or copolymers and olefinic polymers and/or copolymers. The invention also relates to the thus chlorinated products.

Prior art

It is known that chlorinated polymeric materials may be obtained from vinyl chloride polymers and/or copolymers and olefinic polymers and/or copolymers by chlorinating the latter, in the form of small particles, in a dry or practically dry phase.

These known processes are carried out on an industrial scale at relatively low temperatures, generally between 20° C. and 90° C. for reasons of thermal control.

Within this range of temperatures, the rate of chlorination is very low, and as a result thereof, it is necessary to effect the chlorination in the presence of activators of either the chemical or the physical type.

In general, the chemical activators are substances which decompose under the reaction conditions to form free radicals. The free radicals act as activators for the chlorine and enable a good reaction rate to be achieved, even at the relatively low reaction temperatures which are used. Generally, these substances are organic peroxides or azonitriles.

The preferred physical activator is ultraviolet radiation. For this purpose one or more lamps, capable of emitting radiations having a wave length between 2,000 and 4,000 A., are placed inside the chlorination reactors used in the process.

Both types of activation have certain disadvantages. Thus, in the case of activation with organic peroxides, trace amounts of these substances almost always remain incorporated in the chlorinated materials even after repeated washings. The presence of these trace amounts is quite harmful to the stability of the chlorinated materials which generally have a very low thermal resistance.

In the case of activation with UV-radiation, there are numerous disadvantages which influence the properties of the chlorinated materials.

The presence, within the reactor, of one or more ultraviolet lamps, gives rise to certain complications, since the UV-lamps quickly become covered by a layer of polymer powder. This coating considerably reduces the efficiency of the lamps, which in turn adversely affects the ability of the UV-radiation to activate the chlorination reaction.

Moreover, it is almost impossible to ensure a uniform distribution of the UV-radiation throughout the reaction mass.

SUMMARY OF THE INVENTION

It is an object of the present invention to provide a process for chlorinating polymeric materials in the dry phase with gaseous chlorine, which is free of the above-described disadvantages.

This, and other objects are realized by the process according to the invention wherein polymeric materials, in the dry phase, are chlorinated with gaseous chlorine in the presence of elemental fluorine.

The process according to the invention is carried out using chlorination techniques which are well known in the art. Particularly advantageous results are attained using the fluid bed technique, according to which the polymeric material, in the form of small particles is fluidized by means of a gaseous stream during the chlorination. It has, quite surprisingly, been found that under these circumstances, it is possible to attain satisfactory chlorination rates, even in absence of UV-radiation or organic peroxides.

The process is carried out using dry gaseous chlorine as a chlorinating agent which, either alone or in admixture with inert gases (for the chlorination of the polymeric material) such as nitrogen, hydrochloric acid, xenon, argon and the like, also acts as a fluidizing gas for the polymer particles.

Alternatively, the fluidizing gas may consist of one or more inert gases of the above indicated type.

When the amount of elemental fluorine is between 0.1 part and 5 parts, preferably between 0.1 and 1.2 parts by volume per 100 parts by volume of the gaseous fluidizing mixture, there are obtained chlorinated polymeric materials having characteristics similar to those of chlorinated polymeric materials prepared in the presence of UV light or peroxides as activators.

The polymeric materials which may be chlorinated by the present process are selected from the group consisting of vinyl chloride polymers and/or copolymers and olefinic polymers and/or copolymers.

The expression "vinyl chloride polymers and/or copolymers," when used herein, means: (a) vinyl chloride homopolymers prepared by conventional processes of polymerization in bulk, in emulsion or in suspension, at temperatures between $-60°$ C. and $+80°$ C.; (b) copolymers of vinyl chloride with other monomers copolymerizable therewith, such as vinylidene chloride, vinyl esters, acryl and/or methacryl esters, lower alpha-olefins such as ethylene, propylene and isobutylene; and (c) graft copolymers of vinyl chloride on polymeric materials of different kinds, such as synthetic elastomers (polybutadiene, butadiene copolymers, ethylene-propylene copolymers and ethylene-propylene-diene hydrocarbon terpolymers), chlorinated polyethylenes and sulphochlorinated polyethylenes and the like as well as mixtures of two or more polymeric materials of the above indicated type.

The expression "polyolefins and/or co-polyolefins," when used herein, means: polyethylene, polypropylene, polyisobutene, poly-2-methylpentene-1, polyalkenamers, ethylene-propylene copolymers, ethylene-propylene-diene hydrocarbon terpolymers and the like as well as mixtures of two or more polymeric materials of the above indicated type.

All of these polymeric materials are used in the form of small particles, of a size such as can be fluidized by a gaseous stream in the fluid bed technique and with particle sizes preferably between 50 and 500 microns.

In the case of vinyl chloride homopolymers, prepared by polymerization in an aqueous suspension at a temperature between 40° C. and 60° C., it is preferred to use polymer particles having a size between 50 and 150 microns.

The process according to the invention may be carried out at temperatures between about —10° C. and 120° C., depending on the kind of polymer which is being chlorinated.

Particularly favorable results are obtained in the case of vinyl chloride polymers and/or copolymers by chlorinating at temperatures between about 20° C. and 60° C., and in the case of olefinic polymers and copolymers, at temperatures between about 20° C. and 90° C., although it is possible to effect the chlorination reaction at temperatures which are outside these temperature ranges.

When operating at high temperatures, particular care must be taken to remove the heat of reaction, in order to avoid localized temperature increases that may cause a rupture of the polymer chains. On the other hand, when operating at low temperatures, it is not possible to use water as a heat-regulating medium for the reactor.

The process according to the invention may be carried out either in a continuous or discontinuous manner in one or more reactors placed either in series or in parallel.

As compared with the known processes carried out in the presence of UV light, the present process has the following advantages:

(a) a substantial simplification of the process in general and of the chlorination step in particular. In fact, the chlorination reactor is of much simpler construction and maintenance, due to the absence of UV-lamps;
(b) the elimination of the costs resulting from the low energy output of the UV-lamps and from their fast wear (average life about 1,000 hours);
(c) the elimination of the necessity of periodic cleaning of the radiating surface of the UV lamps;
(d) uniform distribution of the activation throughout the whole reaction mass, and not only in the regions near the source of the UV radiation.
(e) efficient control of the course of the reaction.

The chlorinated polymeric materails prepared by the process according to the invention display quite satisfactory chemical and physical characteristics, similar to those of the chlorinated polymeric materials prepared by known processes.

The chlorinated polymeric materials prepared by the present process, may, depending on the reaction conditions, also contain amounts of chemically combined fluorine, which are generally less than 2% by weight of the polymer.

The fluorine content of the polymer is, however, always within such limits as will not adversely influence the physical and chemical characteristics of the chlorinated polymer. These characteristics are always similar to those which are typical of polymeric materials chlorinated according to other well known techniques.

DETAILED DESCRIPTION

The following examples are given in order to better illustrate the essential features of this invention, without, however, limiting the scope thereof.

EXAMPLE 1

An electrolytic cell for elemental fluorine (a molten bath of KF-HF with about 40% by weight of HF) was operated with a 100 ampere current, at a temperature of from 90° C. to 92° C., to eliminate any traces of oxygen and $F_2O$ from the evolved fluorine.

At the same time, a reactor with a holding capacity of 1,000 cc. and suited for the chlorination of PVC* according to the fluid bed technique, was heated to a temperature of 20° C. (at which temperature the chlorination reaction was subsequently carried out).

The polymer to be chlorinated was a high porosity PVC, having the properties set forth in Table I.

TABLE I

Characteristic of the polymer to be chlorinated:

| | |
|---|---|
| Chlorine content (by weight) | 56.7%.[a] |
| Intrinsic viscosity | 100 ml./g.[b] |
| Vicat penetration temperature | 86°.[c] |
| Thermal stability | $1.50 \times 10^{-3}$ hr.$^{-1}$ [d] |
| Particle size | 50–150 microns. |

[a] Determined according to the Schöninger method.
[b] Determined in cyclohexanone at 25° C.
[c] Determined according to ASTM D 1525–58 modified standards, that is, by adopting a load of 5 kg. in oil, with a penetration of 1 mm.
[d] Determined according to ASTM D 793–49 standards.

The above described PVC was charged into the reactor and repeatedly washed with nitrogen for about 1 hour. At the same time, the current density in the fluorine cell was so reduced as to yield an hourly output of fluorine of about 35 g./hr. (equal to about 21 liters/hour).

Thereafter, the fluidizing gas was fed into the reactor. Initially, the gas consisted of dry nitrogen, and then of a nitrogen-chlorine mixture, to which the flow of fluorine coming from the electrolytic cell was introduced. Under stationary conditions, the percentage by volume composition of the fluidizing gas was the following:

| | Percent |
|---|---|
| Chlorine | 50 |
| Nitrogen | 49.25 |
| Fluorine | 0.75 |

The fluidizing gas was fed to the bottom of the reactor in order to impart to the polymer particles a turbulent motion, with a fluidization rate of about 0.1 m./sec.

The reaction was continued for about 2 hours under these conditions. Thereafter, the flow of fluorine and then the flow of chlorine was interrupted and nitrogen was passed through the reactor for one hour at a temperature of about 55° C.

Then the chlorinated polymer was discharged from the reactor and first washed with water and then with an aqueous 1% $NaHCO_3$ solution and finally dried at 50° C. with hot air.

The chemical and physical characteristics of the polymer after the chlorination are summarized in Table II.

TABLE II

Characteristics of the post-chlorinated polymer:

| | |
|---|---|
| Chlorine content (percent by wt.) | 61.7% [a] |
| Fluorine content (percent by wt.) | 0.75% [e] |
| Intrinsic viscosity | 102 ml./g.[b] |
| Vicat penetration temperature | 103° C.[c] |
| Thermal stability | $1.1 \times 10^{-3}$ hr.$^{-1}$.[d] | a, b. c, and d : See footnotes to Table I.
[e] Determined by potentiometric measurements with a lanthanum fluoride electrode.

EXAMPLES 2–6

Examples 1 was repeated at different temperatures, with various compositions of the fluidizing gas and over different reaction times.

The reaction conditions and the characteristics of the chlorinated polymers thus obtained are summarized in Table III.

---
*PVC = polyvinylchloride.

TABLE III

| Example | 2 | 3 | 4 | 5 | 6 |
|---|---|---|---|---|---|
| Reaction conditions: | | | | | |
| Fluidizing gas: | | | | | |
| Chlorine (percent by volume) | 50 | 50 | 50 | 50 | 18.5 |
| Fluorine (percent by volume) | 0.75 | 0.75 | 1.2 | 0.4 | 0.4 |
| Nitrogen (percent by volume) | 49.25 | 49.25 | 48.8 | 49.6 | 81.1 |
| Chlorination temperature (° C.) | 55 | 65 | 40 | 55 | 65 |
| Reaction time (minutes) | 100 | 320 | 100 | 100 | 560 |
| Characteristics of post-chlorinated polymers: | | | | | |
| Chlorine content (percent by weight) a | 64 | 67.3 | 64.4 | 64.1 | 65.4 |
| Fluorine content (percent by weight) e | 0.6 | 0.9 | 1.1 | 0.2 | 1.0 |
| Intrinsic viscosity b | 102.5 | 103.8 | 102.5 | 102.5 | 102.9 |
| Vicat temperature c | 113 | 134 | 114 | 113 | 123 |
| Thermal stability, hrs. $^{-1} \times 10^{-3}$ (d) | 0.71 | 0.41 | 0.65 | 0.70 | 0.52 | a, b, c, d, and e: See footnotes to Tables I and II.

EXAMPLE 7

Using the method described in Example 1, a vinyl chloride propylene copolymer having the following characteristics:

Vinyl chloride (percent by wt.) ----- 97.5.
Propylene (percent by wt.) --------- 2.5.
Chlorine content (percent by wt.) --- 55.3.
Intrinsic viscosity (ml./g.) --------- 70.
Vicat penetration temp. (° C.) ------ 81.
Thermal stability ----------------- $1.63 \times 10^{-3}$ hr.$^{-1}$.

was subjected to chlorination under the following conditions.

Composition of the fluidizing gas:

Chlorine (percent by volume) -------- 50.
Fluorine (percent by volume) -------- 0.4.
Nitrogen (percent by volume) ------- 49.6.
Fluidization rate ------------------- 0.1 m./sec.
Reaction time ---------------------- 3.5 hours.
Reaction temperature --------------- 40° C. to 45° C.

A chlorinated copolymer having the following characteristics:

Chlorine content (percent by wt.) ---- 62.7.
Fluorine content (percent by wt.) ----- 0.6.
Intrinsic viscosity (ml./g.) ---------- 68.
Vicat penetration temperature (° C.) -- 100.
Thermal stability ------------------ $1.1 \times 10^{-3}$ hr.$^{-1}$.

was thereby obtained.

EXAMPLE 8

The method described in Example 1 was repeated, using a powdery polypropylene having a particle size between 149 and 177 microns and a molecular weight of about 800,000.

The chlorination reaction was carried out for about 4 hours at 40° C. The obtained polymer had a chlorine content of 20.6% by weight and a fluorine content of 0.15% by weight.

EXAMPLE 9

Example 8 was repeated with a reaction time of 8 hours. A chlorinated polypropylene having a chlorine content of 36% by weight and a fluorine content of 1.35% by weight was obtained.

EXAMPLE 10

Example 8 was repeated at a reaction temperature of 55° C. for a period of 3 hours. There was obtained a chlorinated polypropylene having a chlorine content of 32.6% and a fluorine content of 1.03% by weight.

EXAMPLE 11

Example 8 was repeated with the fluidizing gas having a fluorine content of 1.2% by volume. After 4 hours of chlorination at 40° C., a chlorinated polypropylene having 27.5% by weight of chlorine and 0.34 by weight of fluorine was obtained.

EXAMPLE 12

The method described in Example 1 was repeated, using a high density polyethylene, in the form of powder having a particle size between 149 and 177 microns and a molecular weight of about 250,000.

The chlorination reaction was carried out for about 3 hours at 50° C. A chlorinated polyethylene having a chlorine content of 17.1% by weight and a fluorine content of 0.16 by weight was obtained.

EXAMPLE 13

Example 11 was repeated with a reaction time of 5 hours. A chlorinated polyethylene having a chlorine content of 23.8% by weight and a fluorine content of 0.87% by weight was obtained.

EXAMPLE 14

Operating according to the method described in Example 1, an ethylene-propylene copolymer containing 50% by weight of chemically combined propylene having an intrinsic viscosity ($\eta$) of 7.2, measured in a tetralin solution at 135° C. in the form of powder with a particle size between 590 and 840 microns, was subjected to chlorination. After 5 hours of chlorination at 20° C., a chlorinated ethylene-propylene copolymer having 7.1% by weight of chlorine and 0.4% by weight of fluorine was obtained.

EXAMPLE 15

Example 14 was repeated, except that the chlorination was effected in two steps, the first step being at 20° C. for 2 hours, and the second step being at 45° C. for 5 hours.

A chlorinated ethylene-propylene copolymer having a chlorine content of 12.5% by weight and a fluorine content of 0.47% by weight was obtained.

Variations can, of course, be made without departing from the spirit and scope of our invention.

Having thus described our invention, what it is desired to secure and claim by Letters Patent is:

1. A process which comprises chlorinating dry particles of a polymeric material selected from the group consisting of vinyl chloride polymers, vinyl chloride copolymers, polyolefins and copolyolefins with gaseous chlorine in the presence of elemental fluorine at a temperature of about −10° C. to 120° C., in an environment which is substantially free of ultraviolet radiation and organic peroxides.

2. A process as claimed in claim 1, wherein chlorination is effected in a bed of the polymeric material fluidized by a fluidizing gas.

3. A process as claimed in claim 2, wherein the fluidizing gas is an inert gas.

4. A process as claimed in claim 2, wherein the fluidizing gas is a mixture of an inert gas and the gaseous chlorine used for chlorinating the polymeric material.

5. A process as claimed in claim 4, wherein the fluidizing gas further includes the elemental fluorine, said fluorine being present in an amount of about 0.1 to 5 parts by volume per 100 parts by volume of the fluidizing gas.

6. A process as claimed in claim 5, wherein the fluorine is present in an amount of about 0.1 to 1.2 parts by volume per 100 parts by volume of the fluidizing gas.

7. A process as claimed in claim 1, wherein the polymeric material is a vinyl chloride polymer or copolymer having a particle size of 50 to 150 microns and the chlorination is effected at a temperature of about 20° C. to 60° C.

8. A process as claimed in claim 1, wherein the polymeric material is an olefinic polymer or copolymer and the chlorination is effected at a temperature of about 20° C. to 90° C.

References Cited
UNITED STATES PATENTS

| | | | |
|---|---|---|---|
| 2,129,289 | 9/1938 | Soll | 260—196 HA |
| 2,513,330 | 7/1950 | Kaganoff | 260—93.5 |
| 2,560,869 | 7/1951 | Lichty | 260—85.1 |
| 2,748,105 | 5/1956 | Becker | 260—85.3 |
| 2,920,064 | 1/1960 | Baptist | 260—88.2 |

JOSEPH L. SCHOFER, Primary Examiner

J. KIGHT III, Assistant Examiner

U.S. Cl. X.R.

260—80.7, 92.8 A, 93.7, 94.7 HA, 94.8, 94.9 H, 96 HA

UNITED STATES PATENT OFFICE
CERTIFICATE OF CORRECTION

Patent No. 3,813,370      Dated May 28, 1974

Inventor(s) Gian Paolo Gambaretto et al

It is certified that error appears in the above-identified patent and that said Letters Patent are hereby corrected as shown below:

Column 1, line 9: "24,307/71; Jan. 24, 1972, 19,734/72" should read -- 24,307 A/71; Jan. 24, 1972, 19,734 A/72 --.

Column 3, line 46: "materails" should read -- materials --

Column 4, line 10: "Characteristic" should read -- Characteristics --. Column 4, line 68: "Examples 1" should read -- Example 1 --.

Signed and sealed this 22nd day of October 1974.

(SEAL)
Attest:

McCOY M. GIBSON JR.
Attesting Officer

C. MARSHALL DANN
Commissioner of Patents